(12) United States Patent
Browne et al.

(10) Patent No.: US 9,067,526 B2
(45) Date of Patent: Jun. 30, 2015

(54) ESTIMATING THE REMAINING LIFE OF SHAPE MEMORY ALLOY ACTUATORS

(75) Inventors: Alan L. Browne, Grosse Pointe, MI (US); Xiujie Gao, Troy, MI (US); Nancy L. Johnson, Northville, MI (US); Guillermo A. Herrera, Winnetka, CA (US); Christopher B Churchill, Ventura, CA (US); Geoffrey P. McKnight, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 266 days.

(21) Appl. No.: 13/616,531

(22) Filed: Sep. 14, 2012

(65) Prior Publication Data

US 2014/0077940 A1    Mar. 20, 2014

(51) Int. Cl.
*G08B 21/00*    (2006.01)
*B60Q 9/00*    (2006.01)

(52) U.S. Cl.
CPC ........................................ *B60Q 9/00* (2013.01)

(58) Field of Classification Search
CPC ...................... B60R 2021/01184; F03G 7/065
USPC ............... 340/438, 686.1, 679; 324/500, 691; 180/274; 432/1; 702/136
See application file for complete search history.

(56) References Cited

U.S. PATENT DOCUMENTS

| | | | |
|---|---|---|---|
| 7,686,382 B2 | 3/2010 | Rober et al. | |
| 7,866,737 B2 | 1/2011 | Browne et al. | |
| 8,188,757 B2 | 5/2012 | Herrera et al. | |
| 2004/0117081 A1* | 6/2004 | Mori | 701/29 |
| 2006/0092006 A1* | 5/2006 | Grando | 340/438 |
| 2007/0216194 A1* | 9/2007 | Rober et al. | 296/180.1 |
| 2012/0109573 A1 | 5/2012 | Gao et al. | |

* cited by examiner

*Primary Examiner* — Mark Rushing
(74) *Attorney, Agent, or Firm* — Reising Ethington P.C.

(57) ABSTRACT

Mechanical devices powered by Shape Memory Alloy (SMA) wires or other linear elements offer advantages in automotive applications. Such SMA-powered devices are commonly reliable and long-lived but have a finite lifetime. Measurements of the electrical resistivity of an SMA element during operation of the element may be related to the remaining lifetime of the element. Because operation of SMA elements is promoted by heating the element, usually by passage of an electric current, the resistivity measurements, and hence assessment of SMA element operation, may be made without interruption to the operation of the SMA-powered device and without addition of dedicated sensors.

8 Claims, 6 Drawing Sheets

ESTIMATING THE REMAINING LIFE OF SHAPE MEMORY ALLOY ACTUATORS

TECHNICAL FIELD

This invention pertains to monitoring the operation and durability of mechanical actuators fabricated of generally linear shape memory alloy members. More particularly the invention pertains to estimating the expected remaining life of a shape memory alloy actuator using resistance or resistivity measurements made during electrical heating of the alloy members.

BACKGROUND OF THE INVENTION

Shape memory alloys (SMAs) may exist as two phases, a lower modulus, lower temperature, crystalline martensite phase and a higher modulus, higher temperature, austenite phase of a different crystal structure. The transition from one phase to the other may, by appropriate choice of alloy system, alloy composition, heat treatment or applied stress, be selected to occur over a temperature span of from −100° C. up to about +150° C. or so. But many useful SMA alloys exist in their martensite form at, or slightly above, about 25° C. or so, and transform to their austenite form at temperatures ranging from about 60° C.-80° C. or so. These characteristics substantially assure that the SMA will be in its martensitic phase at essentially any ambient temperature experienced by a motor vehicle but may be readily transformed to austenite with only modest heating.

Shape memory alloys may be used as mechanical actuators. Commonly alloys for actuator applications are prepared as generally linear members. These members are commonly wires, but other suitable shapes include tapes, chains or cables. For brevity only, and without limitation, the term wire will be used in future sections. The wires, after shaping to a desired 'remembered' length or shape in their austenite phase are cooled to ambient temperature. On cooling the wires will revert to their martensite crystal structure. The wires may then be stretched and deformed to some predetermined length. The deformation exceeds the maximum allowable elastic strain which may be imposed on the actuator and is often termed pseudo-plastic deformation. These pseudo-plastically-deformed martensitic wires are in the appropriate starting condition for the actuator.

Generally the stretch or strain, that is, the change in length of the wire divided by its original or base length, applied during such pseudo-plastic deformation does not exceed 7% and more commonly may be 5% or less. Importantly, the base length, to which all length changes are referred, is the length of the wire in its high temperature, austenite, phase.

Deformed martensitic shape memory alloys may, when heated and transformed to austenite, revert to their original undeformed shape and are capable of exerting appreciable force as they do so. In changing shape, the wire will shorten by an amount substantially equal to the pseudo-plastic strain previously applied when it was in its martensitic form. So, by suitable choice of wire length, any desired displacement may be achieved. As an example, a 10 inch or so length of wire, prestrained to 5% strain, may enable a displacement of about one-half inch or so.

This change in length, in combination with the ability of the SMA to apply a significant force as it changes length, are the characteristics which make SMAs suitable for use as actuators in mechanical devices. In one common actuator design, a pseudo-plastically stretched martensite SMA wire of a length suitable for an intended displacement, is heated along its entire length and transformed to austenite. The transformation to austenite causing the wire to contract so that it may linearly displace an attached moving element.

In an exemplary application the attached moving elements may be an air dam which may be deployed, on-demand, by action of the SMA actuator. Of course, other linear motion devices such as latches may also be operated by SMA actuators. Also, by addition of pulleys and similar mechanical contrivances, an SMA actuator may be readily adapted to enable rotary motion. Any heat source may be used to elevate the SMA wire temperature and promote its transition to austenite. But, preferably, the wire should be heated uniformly along its length and throughout its cross-section so that substantially the entire volume may be heated and transformed, the transformation being effected generally simultaneously in the wire volume.

One convenient approach which assures generally uniform heating of the entire wire length is electric resistance heating. Electrical connections may be made to the SMA wire ends for attachment to a suitable power source, commonly a nominally 12 volt battery in the case of a motor vehicle, and a controlled current passed along the length of the wire. The applied current may be initially small and increased during the duration of the heating cycle using a ramp, sine, step or arbitrary variation of current with time or a fixed battery voltage may be applied and its heating power adjusted using pulse width modulation (PWM). Generally operation of the actuator occurs over a relatively short time period, typically on the order of 1 or 2 seconds. Application of power is generally under the control of a controller which may be independent of, or integrated with, other on-vehicle electronics. Many SMA-actuated devices are intended to operate over a fixed displacement. Thus, when the SMA device achieves its design displacement, the applied current is reduced to a value sufficient to maintain it at its design stroke. This end-of-stroke current may be termed a terminal current. Any suitable method may be used to signal the controller that end-of-stroke has been reached, including, for example, a contacting or non-contacting micro-switch. Once end-of-stroke is signaled, application of a continuing current sufficient to maintain the wire temperature is required. Suitable controllers and control strategies for accomplishing this are well known to those skilled in the art.

Actuator action may be reversed by stopping passage of the electric heating current and allowing the wire to cool to about ambient temperature and revert to its martensitic crystal structure. Generally forced cooling is neither required nor employed. During cooling, the SMA wire will not spontaneously change its length to its initial deformed length but, in its martensitic phase, it may be readily stretched again to its initial predetermined length. Any suitable approach, including deadweights, may be employed to stretch the wire, but often a spring positioned in series with the SMA wire is used. Stretching may be continued until the wire ends are positioned against preset stops which establish the predetermined wire length.

These changes in length result from the transition in crystal structure resulting from the imposed temperature changes. Provided the transition in crystal structure is fully reversible this cycle of extending and contracting the wire by application of suitable thermal stimulus may continue indefinitely.

In practice however, the phase transitions and the accompanying cyclic transitions from extended length to retracted length and back again to extended length, are not completely reversible. This irreversibility may lead to changes in the operating characteristics of the SMA wire with continuing use and even to fatigue of the SMA wire after extensive use.

The occurrence of such fatigue may be promoted by overdriving or otherwise exceeding the design parameters or capabilities of the SMA wire There is therefore a need to monitor SMA wire performance. In particular there is need for a method of detecting any change or deterioration in device capability. Preferably such change may be detected before it has increased to a level where a device may be rendered inoperative. More preferably the extent of any change may be interpreted to signal the remaining life of the device.

SUMMARY OF THE INVENTION

This invention provides an electrical resistance-based method of monitoring the condition of an SMA actuator in a device and of estimating its remaining useful life.

Since heating is commonly accomplished using electrical resistance heating, the wire resistance may be determined as it is being heated during an actuation cycle without interruption to the process. The resistance is simply the ratio of the instantaneous voltage to instantaneous current and, with repeated sampling, a near-continuous record of the SMA element resistance may be obtained. Generally resistance measurements are satisfactory, but, if necessary, the resistance, R, may be used to compute the resistivity, $\rho$, which is material dependent but geometry-independent. Specifically:

$$\rho = (A/L) \times R$$

where A=element area; L=element length; and R=element resistance It will be appreciated that resistivity has the dimensions of resistance×length, for example ohm-meters. As will be discussed in greater detail subsequently, the length of the SMA may be readily assessed, enabling the area to be computed since the wire volume remains constant.

Both the resistance and resistivity vary in a systematic and similar manner during the heating time of the SMA. By extracting some characteristic features from the resistance or resistivity versus heating time curves and monitoring changes over repeated cycling of the SMA, the state of the SMA and its remaining life may be estimated. A typical heating cycle or deployment cycle may be as short as one or two seconds. So developing sufficient detail in the resistivity record to extract the characteristic features may require a sampling frequency for voltage and current on the order of 500-1000 Hz.

Figure 3:
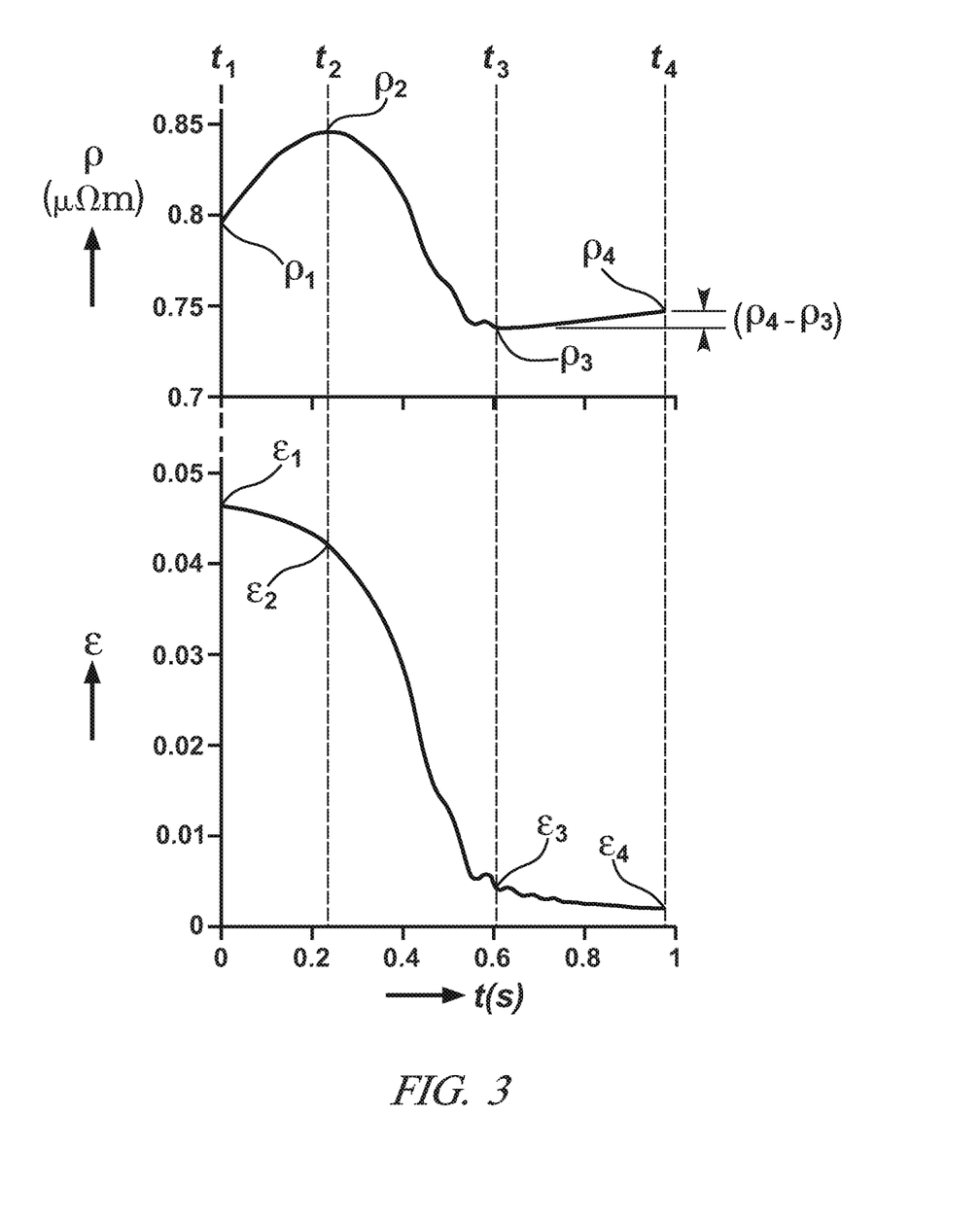
FIG. 3 shows two curves, drawn to a common time scale, showing changes in the resistivity ($\rho$) and strain ($\epsilon$) versus elapsed time t (in seconds) of an SMA wire during actuation. For the small strains shown, the strain will be substantially equal to the elongation undergone by the wire. Note that the unstrained ($\epsilon=0$) state of the wire is the austenitic state.

A curve representative of the change in resistivity with time during actuation and deployment of a fixed displacement SMA-actuated device is shown in FIG. 3, in conjunction with a curve showing the associated changes in strain plotted against a common time scale. Initially, the SMA will be at ambient temperature or about 25° C. At this temperature the SMA will be in its martensite phase and will have undergone a strain $\epsilon_1$, relative to its austenitic state, and exhibit a resistivity $\rho_1$. On heating, the SMA will attain its transformation temperature and its resistivity will initially increase, reach a maximum ($\rho_2$) at a strain $\epsilon_2$ and then rapidly decrease to a minimum value ($\rho_3$) at a strain $\epsilon_3$. Continued heating will induce a terminal value of resistivity $\rho_4$ in the wire and a corresponding terminal, non-zero, strain of $\epsilon_4$. Under conservative device operation, $\rho_4$ may be equal to $\rho_3$. An analogous curve results if resistance, R, is plotted rather than resistivity, $\rho$.

The inventors have determined that the magnitude of the difference in resistivity between the minimum resistivity ($\rho_3$) and the terminal resistivity ($\rho_4$), that is ($\rho_4-\rho_3$), increases systematically with increasing degradation of the SMA element over multiple cycles. A similar result holds for the analogous difference in resistance ($R_4-R_3$). When this resistivity (or resistance) difference attains a critical value, device failure may be imminent. Thus with knowledge of the critical value and the current value of the resistivity or resistance difference the remaining life of the SMA may be estimated.

Suitably such life estimation may be performed by an on-vehicle controller capable of: accepting and interpreting electrical signals representative of the instantaneous current and voltage; identifying the significant features of the resistivity versus time curve; and performing some simple calculations to assess the instantaneous performance of the SMA element and to estimate its remaining useful life.

Further the controller may, based on some pre-established criteria, initiate one or more of the following actions: provide a warning or alert to the vehicle operator; restrict further use of the device; or limit the power supplied to the device so that device operates at less than its full capacity.

BRIEF DESCRIPTION OF THE DRAWINGS

FIGS. 5A and 5B are curves showing the changes in resistivity ($\rho$) of an SMA wire during passage of an electric current to heat and transform the SMA. FIG. 5A is representative of a wire very early in the life of the device, typically less than 10% of expected life, while FIG. 5B is representative of the behavior of the wire much later in life say at about 90% of expected life.

DESCRIPTION OF PREFERRED EMBODIMENTS

The following description of the embodiment(s) is merely exemplary in nature and is not intended to limit the invention, its application, or uses.

Shape memory alloys (SMAs) are particular alloys which undergo substantially reversible transformation between two crystal phases—a low temperature phase known as martensite and a high temperature phase known as austenite. The particular phase transformation temperature varies with alloy system, but generally ranges from between about −100° C. to about +150° C. or so. Shape memory behavior has been observed in a large number of alloy systems including Ni—Ti, Cu—Zn—Al, Cu—Al—Ni, Ti—Nb, Au—Cu—Zn, Cu—Zn—Sn, Cu—Zn—Si, Ag—Cd Cu—Sn, Cu—Zn—Ga, Ni—Al, Fe—Pt, Ti—Pd—Ni, Fe—Mn—Si, Au—Zd, and Cu—Zn but only a few of these alloys are commercially available. Nitinol, an alloy of nickel and titanium in substantially equiatomic proportion, enjoys the widest use.

Associated with the change in crystal structure is a change in shape. In most applications the SMA is preformed into a wire or similar elongated form such as a tape or strip, and the change in crystal structure is manifested by a change in the length of the wire or other SMA element. This change in length is characteristic of the specific alloy system and may range up to about 7% or so in some systems such as the Ni—Ti system. As the SMA element seeks to change its length it may apply appreciable force, sufficient to overcome any mechanical drag or opposition. With appropriate design, mechanical devices may be fabricated to harness and utilize the force resulting from transformation to operate or actuate mechanisms or similar mechanical devices.

Figure 1:
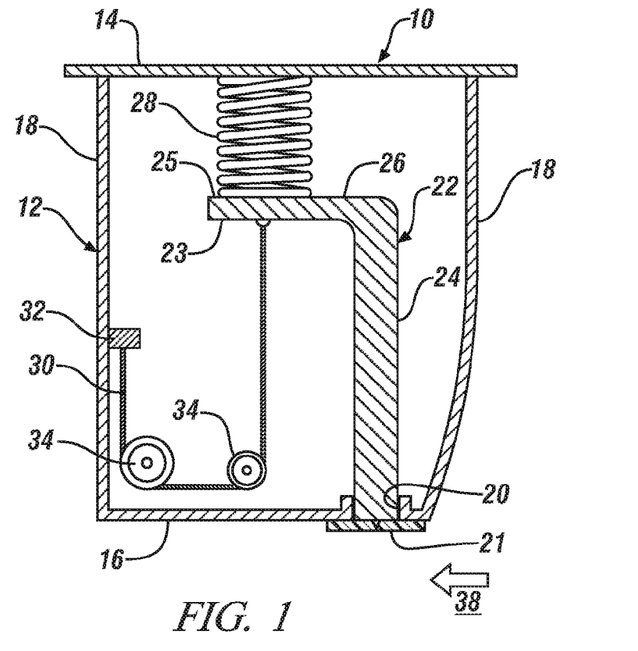
FIG. 1 shows, in section, an SMA device for deployment of a vehicle air dam. The air dam is shown in its stowed or retracted configuration out of the vehicle airflow.
Figure 2:
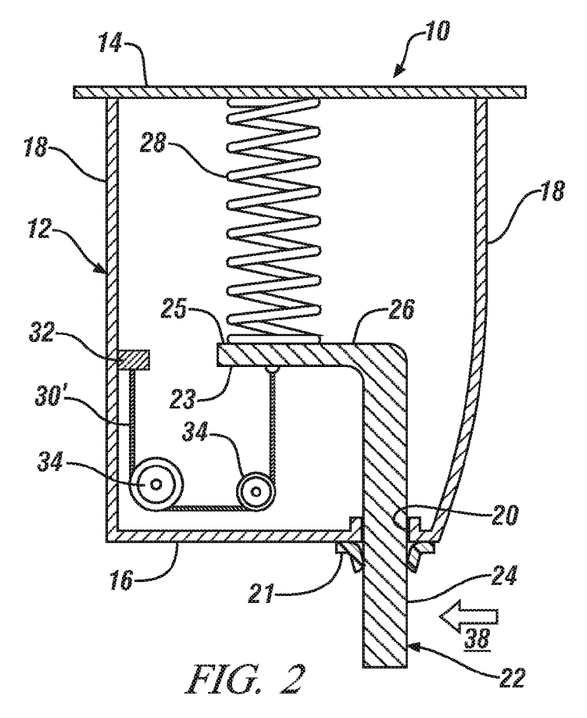
FIG. 2 shows the air dam in its deployed configuration in which it is inserted in to the vehicle airflow.

FIGS. 1 and 2 show a representative example of a fixed-displacement linear mechanical device. FIGS. 1 and 2 are representative of an automotive application of an SMA-actuated device, an SMA-deployed air dam, a device generally fitted beneath the front bumper of an automobile and extending into the under-vehicle airflow. Air dams are most effective at high speeds and may improve the handling and control of the motor vehicle, increase fuel economy, and also improve the routing of air flow for cooling/heat exchange in the vehicle engine compartment. The effectiveness of air dams is greatest when they extend almost to the roadway but this configuration renders them most vulnerable to impact with roadway obstacles. Thus the geometry of fixed air dams necessarily represents a compromise between aerodynamic effectiveness and avoiding collision of the air dam with obstacles or road hazards. A better compromise may be made by using a retractable air dam. Such a retractable air dam offers opportunity of deploying the air dam only at high speed and retracting the air dam to a stowed position at low speeds to minimize the likelihood of a damaging air dam collision when the air dam is least effective.

In the sectional view of FIG. 1 the air dam system 10 includes air dam 22, housing 12 and an SMA actuation system comprising SMA wire 30. The air dam is shown in its stowed position located out of airflow 38. Air dam 22 is generally L-shaped with a longer portion 24 intended for insertion into air flow 38. The shorter section 26 of air dam 22 has opposing surfaces 23, 25 and is mechanically attached to the SMA wire and responsive to its movement. Surface 23 is secured to an end of SMA wire 30 and surface 25 to an end of tension spring 28. The opposing end of spring 28 is attached to the underside of cover 14. SMA wire 30 is secured at its other end at mount 32 and routed around pulleys 34 to enable a more compact device. The device is contained within housing 12, formed of opposing, generally vertical walls 18, generally horizontal cover 14 and opposing closure 16. Closure 16 includes a slotted opening 20 with compliant flap seals 21 which sealingly engage to deny access of road splash and debris to housing 12 when air dam 22 is retracted and stowed.

In FIG. 2, SMA wire 30 has been actuated, preferably by utilizing the mechanical connectors on the wire ends as electrical connectors and passing an electric current along the length of the wire (details not shown). Wire 30, prior to heating of the wire by the electric current, or other applicable means, was in its low temperature, lower strength martensitic state. In its low modulus, martensite state, spring 28 may deform and elongate wire 30 retracting air dam 22 into housing 12 as shown in FIG. 1. Heating SMA wire 30 results in its transformation into its higher strength austenitic state, shown as wire 30' in FIG. 2. Associated with its transformation to higher strength austenite, wire 30 seeks to shrink to a length appropriate to austenitic wire 30'. As it does so it applies sufficient force to overcome the force exerted by spring 28, causing spring 28 to extend and forcing portion 24 of air dam 22 through opening 20 where it extends into airflow 38. Seals 21 are deflected into contact with the opposing surfaces of portion 24 of the air dam, so that they may continue to exclude moisture and debris from housing 12.

On cessation of heating, wire 30' will cool and transform to martensitic wire 30. The lower strength martensitic wire 30 may be deformed by spring 28, enabling spring 28 to contract and, because of its connection to surface 25 of air dam 22, retract air dam 22 within housing 12 as shown at FIG. 1.

In this application, the SMA actuator mechanism is intended to operate in fixed displacement mode so that the air dam will extend beyond the housing by some predetermined extension. This, relatively simple, operating scheme may be implemented, for example, by progressively increasing the applied current passed through the wire until the design displacement is achieved and then continuing to apply the terminal current necessary to maintain the desired deployment.

For this example, and other automotive applications, resistance heating may result from passage of direct current (DC) electricity stored in a vehicle battery. Non-automotive applications may also employ alternating current (AC). Improved control of the heating may result from using pulse width modulated (PWM) direct current. Thus any subsequent description of an electric current in this application may encompass both the instantaneous DC current and an equivalent AC or PWM current. Similar considerations apply to voltage. It will be appreciated that since the average current is varied over the duration of the heating cycle, which may be as short as a second or so, that any determination of average current should be based on an appropriately-short time window.

The just-described mechanism is, of course, specific to its intended use. However the general approach, using a spring capable of deforming an SMA element in its martensitic state but incapable of resisting the force applied by the SMA element as it transforms to austenite is widely used in fixed displacement, linear device applications. Similar devices may be used for rotary applications.

The data and results reported herein were developed using a 0.006 inch diameter. 115 millimeter long NiTi-based wire sold by Dynalloy (Tustin, Calif. 92780) under the trade name Flexinol® and tested under an ambient temperature of about 22° C. This wire, when under no stress, transforms from austenite to martensite over the temperature range 45° C. to 55° C., and from martensite to austenite over the temperature range of 70° C. to 75° C. All samples were subjected to at least 100 heating-cooling cycles with some samples undergoing up to 300,000 cycles. Heating was by electric resistance heating, employing a voltage of around 4 volts and a current of 500 mA or so, with natural cooling. The wire was heated, in about 1-2 seconds, to a maximum temperature of between 100° C. and 200° C., typically to about 130° C., and cooled, in between 0.5 to 2.0 seconds, to a temperature suitable for transforming to martensite.

During operation of the SMA device the resistance R may be determined provided the voltage (V) and current (I) are known using the relation $V=I \cdot R$ or, $R=V/I$. In most practices of this invention it will be sufficient to track changes in resistance as described more fully below. However, the value of resistance, in addition to the wire composition, temperature and phase, depends on the wire geometry, its length and cross-sectional area. The influence of these geometrical factors may be compensated by using resistivity (ρ), rather than resistance, where ρ=A/L·R with A=wire cross-sectional area and L=wire length. The resistivity data reported here employ the instantaneous values of wire area and length as the wire dimensions change during actuation, but because the maximum change in wire length is usually less than 7% the general form of the curves would be maintained if resistance rather than resistivity were plotted. The wire length may be inferred from the measured change in resistance and the area computed using the length and subject to the requirement that the wire volume remains essentially constant.

Changes in the strain and resistivity of the SMA wire during actuation of the device are represented by the curves shown in FIG. 3, which were developed for the Flexinol® wire described above. While the numerical values are specific to the tested wire, the form of these curves is generally reflective of the transformation of any SMA element from martensite to austenite to produce the transition from the device configuration of FIG. 1 to the configuration of FIG. 2. In FIG. 3, plots of SMA element resistivity (ρ) and SMA element strain (ε) are shown plotted against a common time scale corresponding to the application of an electric current to heat and transform the wire. The initial temperature of the SMA is less than its transformation temperature so the wire is initially in its martensite phase.

At the onset of transformation, and before any cycling has occurred, the SMA will have a strain of $\varepsilon_1$, referred to the wire in its original austenite phase. This strain, approximately equal to the wire elongation, represents the maximum strain or elongation undergone by the SMA. In its initial state the SMA has a resistivity of $\rho_1$.

After heating is initiated, the resistivity increases to a peak value $\rho_2$ with a corresponding decrease in strain to $\varepsilon_2$. As the temperature continues to increase, and the transformation of the pre-existing martensite phase to austenite becomes more extensive, the resistivity decreases to a minimum value $\rho_3$ corresponding to a marked reduction in strain to $\varepsilon_3$. Further heating results in a further minor reduction in strain to $\varepsilon_4$ with a modest increase in resistivity to a terminal resistivity $\rho_4$.

The inventors have determined that the remaining life of the SMA actuator may be determined from consideration of certain of these various features of the resistivity versus time curve, particularly the difference between the terminal resistivity $\rho_4$, and the minimum resistivity, $\rho_3$.

Figure 4:
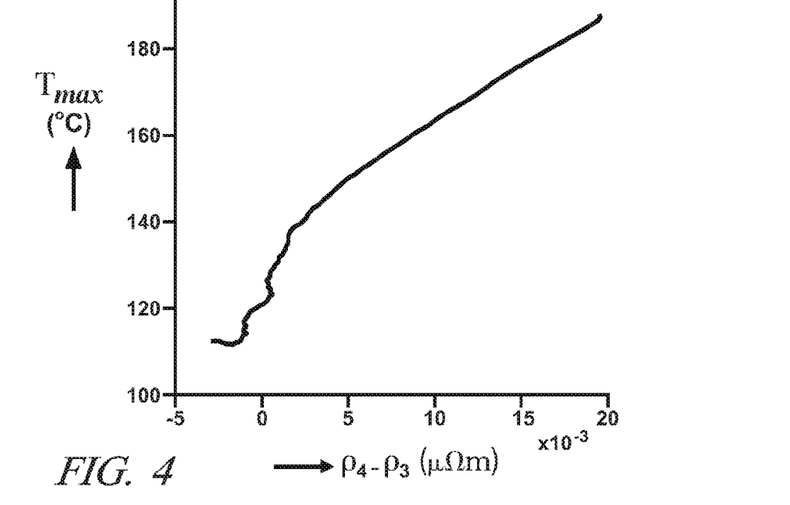
FIG. 4 shows a graph of the maximum SMA wire temperature versus ($\rho_4-\rho_3$) illustrating the linear variation in ($\rho_4-\rho_3$) with temperature for maximum temperatures of 140° C. and greater. The results represent the evolution of ($\rho_4-\rho_3$) and maximum temperature as a wire is repeatedly cycled, over thousands of cycles, to develop a fixed displacement.

The minimum resistivity, $\rho_3$, indicates the residual strain level in the actuator after the bulk of the transformation has taken place. Additional transformation may result from continued heating, reducing the strain to $\varepsilon_4$ and increasing the resistivity to the terminal resistivity, $\rho_4$. However as shown at FIG. 4, this continued heating results in an overtemperature condition and the resistivity difference ($\rho_4-\rho_3$) is linearly related to the maximum temperature when the maximum temperature exceeds 140° C.

Figure 5A:
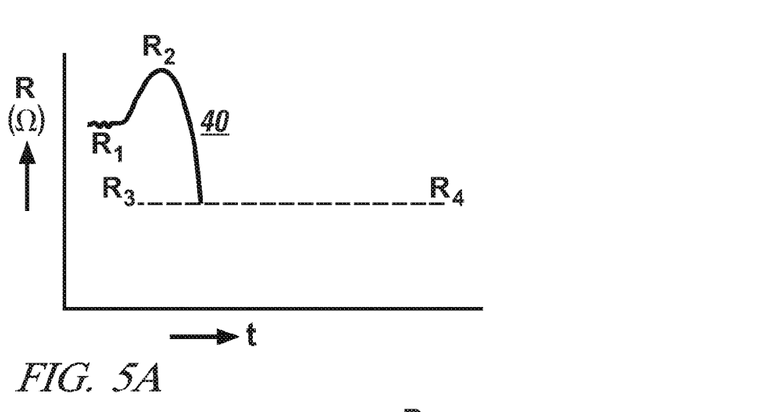
Figure 5B:
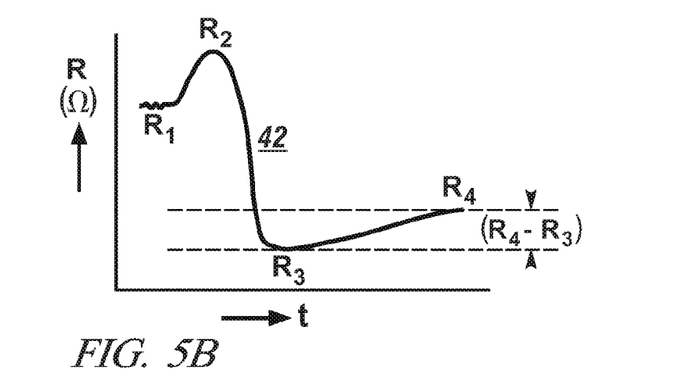

The utility of the resistivity values and their differences may best be appreciated by consideration of the evolution in the resistivity versus actuation or heating time curves for a particular SMA actuator as shown in FIGS. 5A and 5B. For convenience, the actuator may be selected to be typical of that employed as the actuator in a linear mechanism such as shown in FIGS. 1 and 2. In this application the actuator is intended to position a device at one of two positions. These positions correspond to a first position when power is applied and a second position when power is removed, and may, in different devices, be variously described as a deployed or an advanced or a powered-on position and a stowed or a retracted or a powered-off position among others. Whatever the terminology the actuator is intended to deliver a fixed stroke or displacement over some design lifetime, generally expressed in terms of a number of cycles, with each cycle corresponding to one progression of the actuator from the first position to the second position and back to the first position.

Commonly such SMA actuators are designed conservatively so that initially the intended displacement is obtained without fully transforming the SMA. In such a fixed displacement device, the resistance of the SMA element during heating evolves in a consistent and reproducible manner from the curve of FIG. 5A to the curve of FIG. 5B. Early in its intended life the resistance will follow the pattern of FIG. 5A. Typically the device will be at ambient or near-ambient temperature initially and the resistance will modestly increase until the temperature at which the martensite begins to transform to austenite is reached. The resistance will then adopt its maximum value $R_2$ as the phenomena described in connection with FIG. 2 occur and the strain in the SMA element progressively reduces. When the SMA achieves a strain corresponding to the desired device displacement, the current may be maintained at its current value resulting in a constant resistance ($R_3$). Because of the conservative design of the actuator, generally only some portion of the SMA will have transformed, and the measured resistivity value ($R_3$) will not be representative of a fully austenitic wire.

After some cycling, cycle-to-cycle irreversibility will begin to permanently degrade the SMA element. Typically the SMA element will accumulate some plastic strain, manifested as a permanent extension of the wire, which will lead to a reduction in the available stroke. In a fixed displacement device, this will require that the element contract to a greater extent to compensate for the permanent extension. This will require additional heating so that the SMA may achieve a more elevated temperature to promote additional transformation of martensite to austenite. As this occurs, the value of the term ($R_4-R_3$) will, analogously to the term ($\rho_4-\rho_3$) of FIG. 4, attain a non-zero value and the resistance versus heating time curve will evolve, near end-of life, to that shown in FIG. 5B, the form previously shown in FIG. 3. Now, the rapid decrease in resistance 'bottoms out' at minimum resistance $R_3$ and the resistance then increases gradually before reaching its terminal value $R_4$.

The development of such a minimum in the resistance or resistivity is a clear indication of irreversible changes in the SMA wire and serves as an indication that the SMA wire is approaching the end of its useful life. Thus any non-zero value of ($R_4-R_3$) or ($\rho_4-\rho_3$) will signal approach to device 'end-of-life'.

The difference in resistance ($R_4-R_3$), like the difference in resistivity ($\rho_4-\rho_3$) of FIG. 4, is proportional to the overtemperature or temperature in excess of 140° C. for the SMA alloy investigated. It is these overtemperature excursions which promote yet further irreversible extension of the SMA wire and lead to its eventual failure.

Figure 6A:
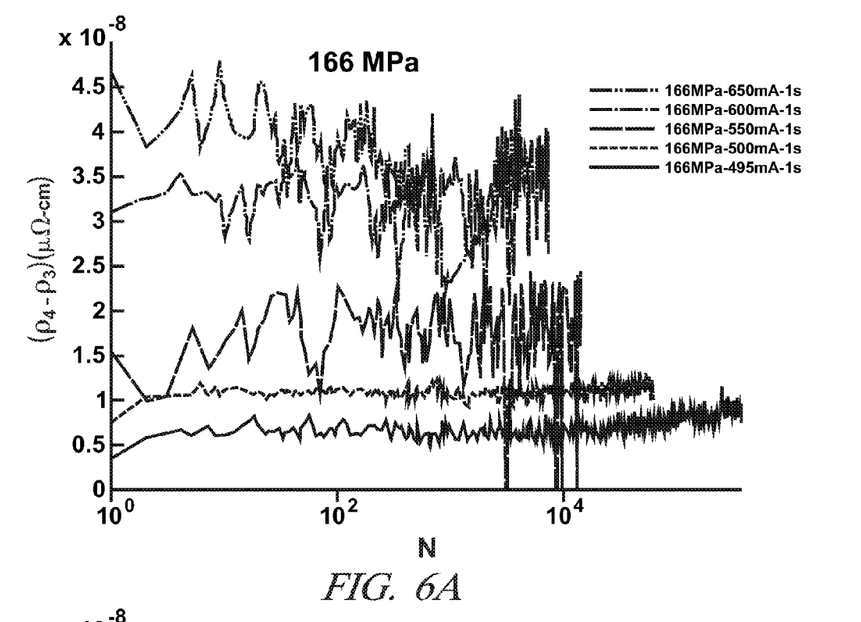
FIGS. 6A-C illustrates the variation of SMA wire lifetime with applied current under several different static loads.
Figure 6B:
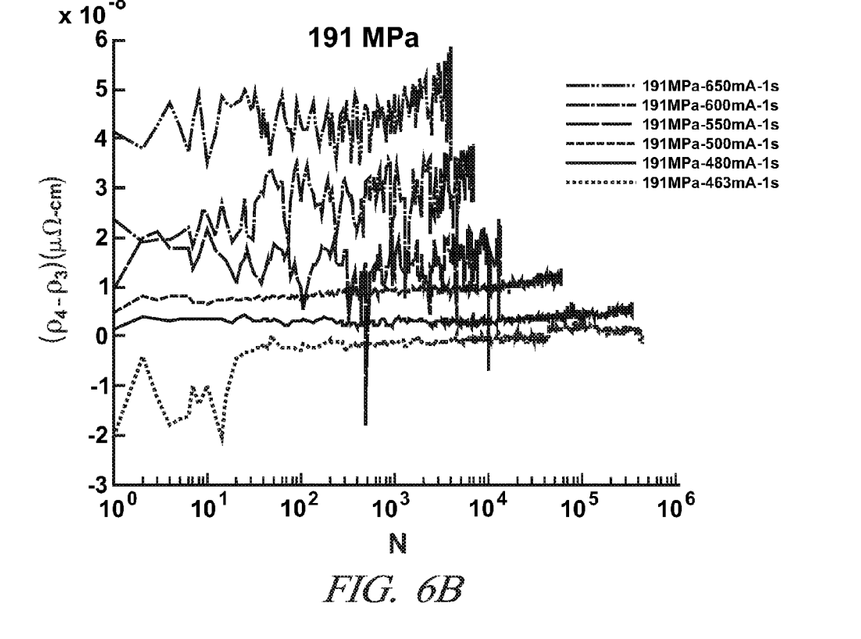
Figure 6C:
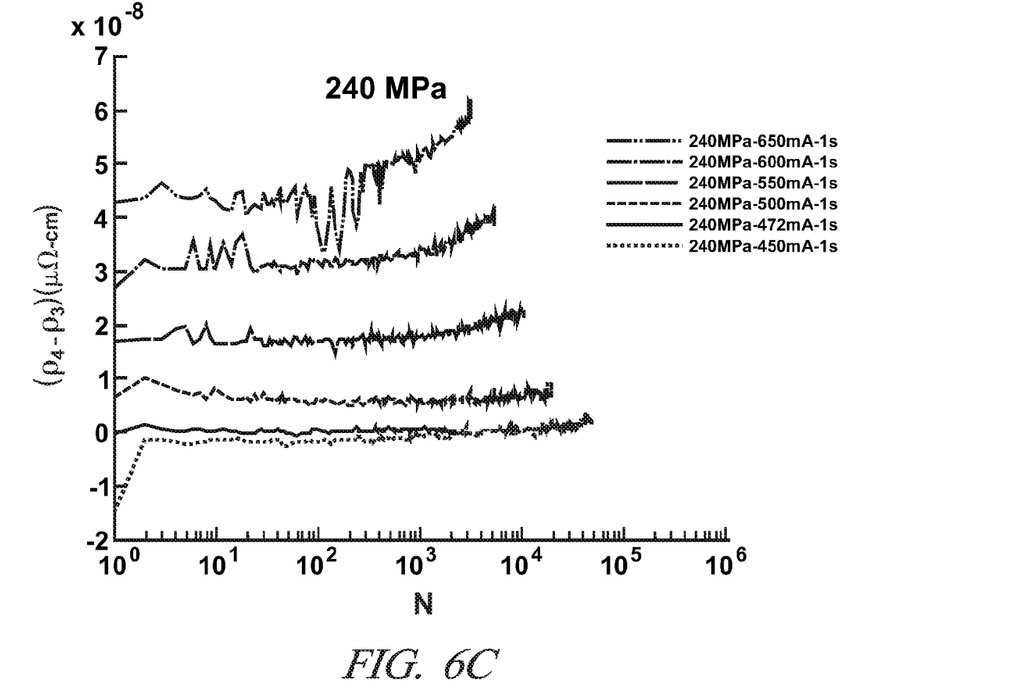

The inventors have determined that the magnitude of the resistivity difference ($\rho_4-\rho_3$) is inversely related to the remaining life of the SMA wire. Each of FIGS. 6A-C shows a series of curves developed using an SMA wire to repeatedly raise and lower a weight of a specific mass. A series of fixed electrical currents is applied to the SMA wire for a period of 1 second and the value of ($\rho_4-\rho_3$) is plotted versus the number of the test cycle until the wire fails by fracture. The terminal (failure) cycles for each current are described by a failure curve. Because the test is conducted under a fixed stress and without any attempt to control displacement, the value of ($\rho_4-\rho_3$) changes very little over the life of the wire. The clear relationship between ($\rho_4-\rho_3$) and life is evident and a similar relationship obtains under alternate operating schemes, such as that employed on the air dam of FIGS. 1 and 2.

Thus the magnitude of the parameter $(\rho_4-\rho_3)$, or equivalently of $(R_4-R_3)$, may be employed to provide two pieces of information on the state of the SMA wire. First, since the device is initially intended to operate at a terminal resistivity of $\rho_3$, in the early stages of life, the initial value of $(\rho_4-\rho_3)$ will be zero. As is clear from the data of any of FIGS. 6A-C, the measured resistivity change, $(\rho_4-\rho_3)$, may exhibit noise which may, in some circumstances, be comparable to the signal. Hence suitable data smoothing or data averaging techniques, such as a multi-sample running average may be employed to enable systematic changes to be more reliably detected. But the onset of a statistically-reliable, that is, not noise-generated, positive non-zero value of $(\rho_4-\rho_3)$ may serve as an early indication that an SMA wire is approaching its end of life and that wire fracture may be anticipated.

Figure 7:
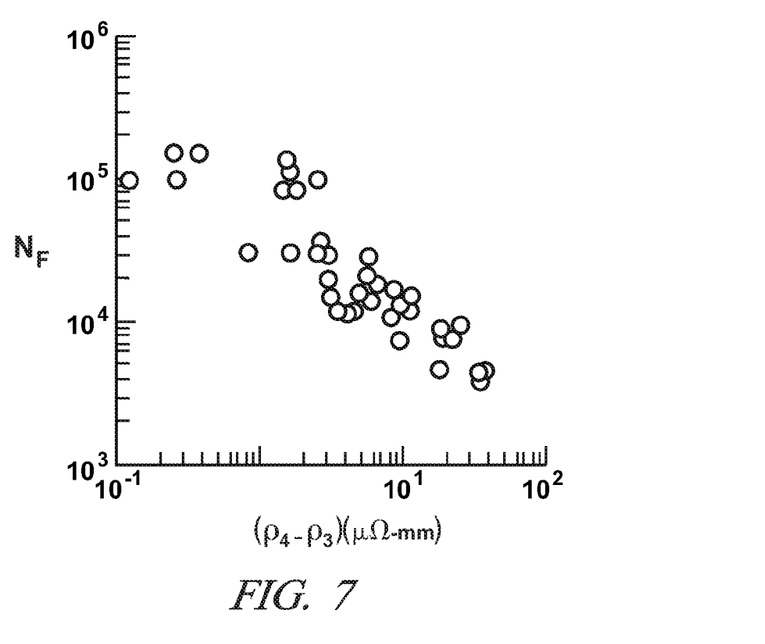
FIG. 7 is a graph of the logarithm of the SMA wire life ($N_F$), expressed in cycles and the logarithm of the change in resistivity, ($\rho_4-\rho_3$).

In FIG. 7, the logarithm of the cycles to failure is shown plotted against the logarithm of the resistivity. A generally straight line relationship is observed, but in common with many fatigue processes there is some variability in the life of the SMA wire, even under a constant applied current. The scatter tends to be greater at long lifetimes and under small resistivity changes which may be more difficult to measure due to the presence of electrical noise as addressed above. This relationship may be exploited to estimate the remaining useful lifetime (in cycles) of the SMA. A suitable relation for estimating the remaining life of a actuator is:

$$N_{REM}=N(\rho_{43F}/\rho_{43}-1) \qquad \text{Equation 1}$$

where:
- $N_{REM}$=Remaining number of cycles
- N=Current number of cycles
- $\rho_{43F}$=Value of $(\rho_4-\rho_3)$ at failure; a suitable value for the alloy used in this study is $1.8\times10^{-9}$ ohm-meters.
- $\rho_{43}$=Current value of $(\rho_4-\rho_3)$ The above relationship, using the suggested fixed value of $\rho_{43F}$ of $1.8\times10^{-9}$ ohm-meters, has been found to be accurate, to within a factor of two, over the last 70% or so of life, and over lifetimes spanning 4 decades. This level of accuracy, which may be enhanced by 'tuning' or customizing the factor $\rho_{43F}$ for individual devices and SMA compositions, is satisfactory since the estimates are conservative, underestimating the remaining life. Thus, continued device operation, provided some additional life is predicted by the model, should not lead to unanticipated device failure. Also errors in the remaining life prediction lessen as end of life is approached so that the prediction is generally most accurate when failure is imminent.

More generally, given the analogous behavior of resistance and resistivity, the above relationship may be represented as:

$$N_{REM}=N(RR_{43F}/RR_{43}-1) \qquad \text{Equation 2}$$

where:
- $N_{REM}$=Remaining number of cycles;
- N=Current number of cycles;
- $RR_{43F}$=Value of (terminal resistance−minimum resistance) or (terminal resistivity−minimum resistivity) at failure; and
- $RR_{43}$=Current value of (terminal resistance−minimum resistance) or (terminal resistivity−minimum resistivity).

Of course, a value of $RR_{43F}$, like $\rho_{43F}$ appropriate to a specific actuator and SMA wire may be determined experimentally or in any other suitable manner.

Figure 8:
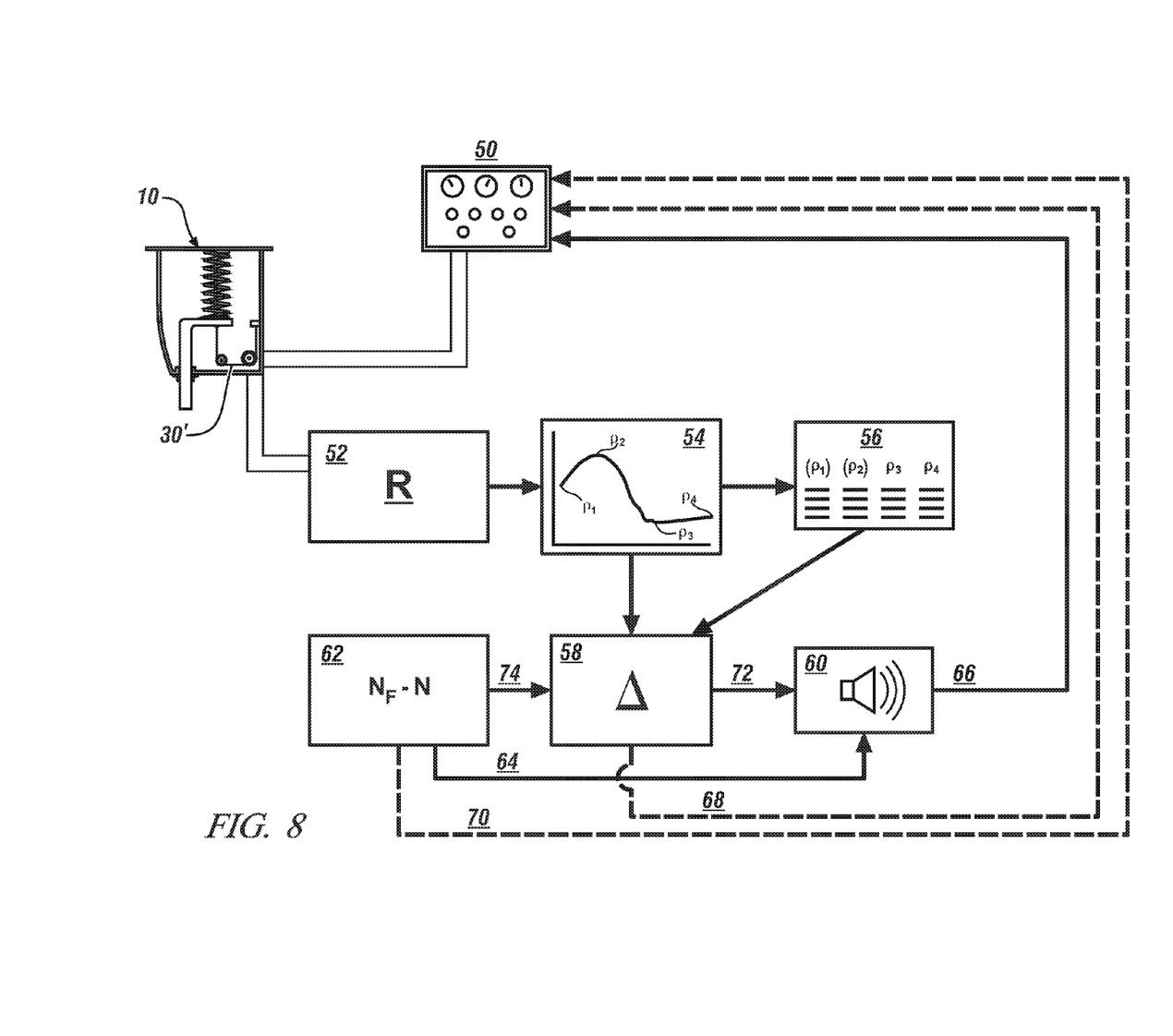
FIG. 8 schematically illustrates the integration and inter-relationships between an SMA device, an SMA device controller and an SMA element diagnostic module.

Knowledge of the variation in resistivity of an SMA device may be incorporated into a control and monitoring scheme as schematically illustrated in FIG. 8. As depicted in FIG. 8, control and monitoring is effected by a series of interconnected modules, each capable of executing one or more operations, with appropriate communication links between them. Those skilled in the art will appreciate that the operations ascribed to each of the modules may be implemented in a like number of separate and distinct devices, as shown, or integrated into a single dedicated device. Also the operations may be implemented in hardware, firmware or software and, if implemented in software, may be implemented in a dedicated computer or implemented in a generalized computing device, such as an Engine Control Module (ECM). Similarly communication links may be internal or external to the devices and may be representative of physical connections of either electrical or optical transmission lines or reflect wireless communication between suitably matched transmitters and receivers.

As shown, an SMA device such as air dam 10 with SMA element 30' is exercised under the control of controller 50 responsive to inputs from either a vehicle operator or an on-board computing device or similar (not shown). An on-board computing device may command controller 50, for example, to actuate device 10 under some predetermined vehicle operating conditions such as exceeding a predetermined vehicle speed. During device actuation a resistance measurement system 52 may repeatedly determine the resistance (R) or, the resistivity ($\rho$) of the SMA element to develop a curve of resistance or resistivity versus heating time like those shown in FIGS. 5A and 5B and FIG. 3. For convenience, future discussion will refer only to resistivity, but analogous procedures apply to resistance measurements also. From the resistivity versus heating time curve, an analysis module 54 may extract values of $\rho_1$, $\rho_2$, $\rho_3$ and $\rho_4$ from the curve. The values of $\rho_3$ and $\rho_4$, and, optionally, of $\rho_1$ and $\rho_2$ also, pass to data bank or data repository 56 where at least some number of the most recent values of these parameters may be stored, for example in a push-down stack.

These values of $\rho_3$ and $\rho_4$ may be passed to a comparator 58 where they may be compared with prior values of these parameters $\rho_3'$ and $\rho_4'$ obtained from data bank 56. Comparator 58 may include some computing and logic capability to enable comparison of the current ($\rho_3$ and $\rho_4$) and prior ($\rho_3'$ and $\rho_4'$) resistivity values, or any combination of these values such as ($\rho_4-\rho_3$) and ($\rho_4'-\rho_3'$).

If such comparison yields an unexpected or problematical result, comparator 58 may pass that result to controller 50 by two routes. In a first approach comparator 58 may first pass the result, via link 72, to operator alert module 60 which in turn will communicate the result to controller 50 via link 66. In a second approach the comparator may pass the result directly to controller 50 via link 68.

The use of both links enables controller 50 to respond appropriately without alerting an operator when a sensed condition calls for no action from the operator. Operator alert 60 may employ auditory signals as depicted but visual and haptic alerts, or any combination of these, may be used. But it is preferred that any visual indication employ messaging so that the operator may be informed of the specifics of any problem and provided some indication of its severity. Color coding of the message characters or the message background may also be employed to communicate the severity of any operational concerns. Thus red-colored characters or a red-colored background might be employed to indicate an issue requiring immediate operator attention, while a yellow-colored character of background may serve to alert the operator to an impending future issue or concern.

Comparator 58 may also pass information to the Remaining Life Prediction module 62, but typically only when a non-zero value of $(\rho_4-\rho_3)$ is recorded. The Remaining Life Prediction module may then execute one of Equation 1 or Equation 2 without concern for 'divide by zero' errors or 'negative divisor' issues. When the estimated remaining life $(N_F-N)$ is less than a preselected threshold the Remaining Life Prediction module 62 may communicate with the Operator Alert module over communication link 64.

As is clear by inspection of FIGS. 6A-C, there can be appreciable cycle-to-cycle variation, or noise, in the instantaneous determined values of $\rho_3$, $\rho_4$ and $(\rho_4-\rho_3)$. It is important that the influence of such noise be minimized so that the progressive and systematic variation in $(\rho_4-\rho_3)$ which may be related to remaining life may be confidently detected. Approaches to reducing noise in digital data are well known to those skilled in the art. Since the noise has a high frequency while the variation in $(\rho_4-\rho_3)$ occurs at a much lower frequency, the evolution of $(\rho_4-\rho_3)$ over time may be extracted by filtering. The individual values of $\rho_3$ and $\rho_4$ may be filtered before computing $(\rho_4-\rho_3)$ or $(\rho_4-\rho_3)$ may be determined from the unsmoothed values of $\rho_3$ and $\rho_4$ and the resulting values of $(\rho_4-\rho_3)$ may be filtered. As an example, a running average may be used to filter the data since a running average is a simple filter in which all terms are weighted equally. Of course more sophisticated filtering schemes which assign variable weights to the data may also be employed.

The Remaining Life Prediction Module may continue to update its estimate of remaining life with continued use of the device, whether or not an alert has been issued. Preferably a continuing series of increasingly urgent alerts would be provided to the operator as the estimated life continues to decline. Representative examples of increasingly urgent alerts may include auditory alerts of increasing loudness, flashing visual alerts of increasing brightness and/or frequency and haptic alerts of increasing intensity. The Operator Alert module may communicate with Controller 50 over link 66 so that the Controller may modify or amend the actuation scheme to minimize degradation if appropriate. For example, as end-of-life approaches, the Controller may revert to a 'limp-home' mode, and communicate this to a vehicle operator, to enable reduced device capability. Communication link 70 enables direct communication between Remaining Life Prediction module 62 and Controller 50, bypassing the Operator Alert module when operator alert is unnecessary, typically when the life threshold has not been crossed.

Examples of limp-home modes may include disabling the SMA function, and hence device operation entirely. Alternatively, for devices, such as the air dam, which actuate automatically under predetermined conditions, the frequency of deployments may be reduced. This may be accomplished, for example, by imposing more restrictive conditions on deployment, say by changing from deploying a speeds in excess of 50 miles per hour to deploying at speeds in excess of 65 miles per hour. A further alternative suitable for some devices, again such as an air dam, which function, albeit at reduced effectiveness, when less than fully deployed, the stroke of the SMA actuator may be reduced by reducing the maximum applied current.

While preferred embodiments of the invention have been described as illustrations, these illustrations are not intended to limit the scope of the invention.

The invention claimed is:

1. A method of alerting a vehicle operator of an impending failure of a spring-biased, shape memory alloy (SMA) element employed as an actuator in an SMA-actuated device in a vehicle, the SMA element having a length and an area, the SMA element repeatedly transitioning between a martensite phase and an austenite phase while cycling between a first and a second length, and, in the course of such cycling, undergoing a progressive loss of utility, the method comprising:
subjecting the element to a plurality of heating and cooling cycles by:
applying an electrical current to the SMA element at an initial temperature to heat the SMA element and promote a time-varying change in length and a time-varying change in area;
during passage of the electric current, repeatedly making simultaneous measurements of the applied electric current and an applied voltage on the SMA element and using these measurements to compute a time-varying resistance, or, after computing the time-varying resistance, using the time-varying resistance in combination with the time-varying element length and the time-varying element area to compute a time-varying resistivity of the SMA element; the time varying resistance having at least an initial resistance, a maximum resistance, a minimum resistance and a terminal resistance, and the time varying resistivity having, at least an initial resistivity, a maximum resistivity, a minimum resistivity, and a terminal resistivity; and then
ceasing to apply current to the SMA element, the SMA element cooling to substantially its initial temperature and being deformed by the bias spring to attain substantially its first length; and
during each of the heating segments of the plurality of repeated heating and cooling cycles on the SMA element, computing minimum and terminal resistance and minimum and terminal resistivity, and the difference between the terminal and minimum resistance or the difference between the minimum and terminal resistivity, until a positive and non-zero difference is determined with statistical reliability; then
alerting the vehicle operator of the impending failure of the SMA element.

2. The method of alerting a vehicle operator of an impending failure of a spring-biased, shape memory alloy (SMA) element as recited in claim 1, the method further comprising estimating a remaining life of the SMA element and communicating the estimated remaining life to the vehicle operator.

3. The method of alerting a vehicle operator of an impending failure of a spring-biased, shape memory alloy (SMA) element as recited in claim 2 in which a number of remaining cycles to failure of the SMA element is estimated using the relation:

$$N_{REM}=N(RR_{43F}/RR_{43}-1)$$

where:
$N_{REM}$=Remaining number of cycles;
N=Current number of cycles;
$RR_{43F}$=Value of (terminal resistance−minimum resistance) or (terminal resistivity−minimum resistivity) at failure; and
$RR_{43}$=Current value of (terminal resistance−minimum resistance) or (terminal resistivity−minimum resistivity).

4. The method of alerting a vehicle operator of an impending failure of a spring-biased, shape memory alloy (SMA) element as recited in claim 2 in which an alert may be one or more of auditory, visual and haptic alerts.

5. The method of alerting a vehicle operator of an impending failure of a spring-biased, shape memory alloy (SMA) element as recited in claim 2 further comprising providing additional alerts to the vehicle operator and the additional alerts become increasingly urgent as the estimated remaining life decreases to zero.

6. The method of alerting a vehicle operator of an impending failure of a spring-biased, shape memory alloy (SMA) element as recited in claim 1 in which a plurality of repeated simultaneous measurements of the applied electric current and applied voltage on the SMA element are made with a frequency between about 500 Hz to about 1000 Hz.

7. The method of alerting a vehicle operator of an impending failure of a spring-biased, shape memory alloy (SMA) element as recited in claim 1 in which the computed terminal resistance and minimum resistance or the computed terminal resistivity and minimum resistivity measurements are smoothed to reduce measurement noise.

8. The method of alerting a vehicle operator of an impending failure of a spring-biased, shape memory alloy (SMA) element as recited in claim 1 in which the differences in the computed terminal resistance and minimum resistance or the differences in the terminal resistivity and minimum resistivity measurements are smoothed to reduce measurement noise.

* * * * *